(12) United States Patent
Tillotson

(10) Patent No.: US 8,827,209 B2
(45) Date of Patent: Sep. 9, 2014

(54) METHODS AND SYSTEMS FOR PROPELLING AN EXTERNALLY POWERED VEHICLE

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 13/311,667

(22) Filed: Dec. 6, 2011

(65) Prior Publication Data

US 2013/0140402 A1 Jun. 6, 2013

(51) Int. Cl.
*B64G 1/40* (2006.01)

(52) U.S. Cl.
USPC ..................................... 244/171.1

(58) Field of Classification Search
USPC ........... 244/171.1, 169, 172.2, 172.3; 60/260, 60/266, 203.1, 641.15
See application file for complete search history.

(56) References Cited

U.S. PATENT DOCUMENTS

| | | | | |
|---|---|---|---|---|
| 3,064,418 A * | 11/1962 | Sanders | ........................ | 60/203.1 |
| 3,668,872 A * | 6/1972 | Camp et al. | ..................... | 60/207 |
| 3,811,358 A * | 5/1974 | Morse | ............................ | 86/20.1 |
| 4,002,031 A * | 1/1977 | Bell | ........................... | 60/641.15 |
| 4,815,443 A * | 3/1989 | Vrolyk et al. | ................. | 126/697 |
| 4,903,479 A * | 2/1990 | Christe | ........................ | 60/203.1 |
| 4,945,731 A * | 8/1990 | Parker et al. | ................ | 60/641.15 |
| 5,138,832 A * | 8/1992 | Pande | .......................... | 60/203.1 |
| 5,459,996 A * | 10/1995 | Malloy et al. | ................ | 60/200.1 |
| 6,311,476 B1 * | 11/2001 | Frye et al. | ..................... | 60/203.1 |
| 6,343,464 B1 * | 2/2002 | Westerman et al. | ......... | 60/203.1 |
| 6,412,274 B1 * | 7/2002 | Miller et al. | ................. | 60/203.1 |
| 6,745,466 B2 * | 6/2004 | Frye et al. | .................. | 29/890.01 |
| 7,003,941 B2 * | 2/2006 | Frye et al. | ..................... | 60/203.1 |
| 7,022,196 B2 | 4/2006 | Cesaroni et al. | | |
| 7,506,500 B1 * | 3/2009 | Krishnan | ........................ | 60/250 |

OTHER PUBLICATIONS

Donahue, B. et al.; Mars Ascent Concept Using NTR with Lithium Propellant; 1998; The Boeing Company; The American institute of Aeronautics and Astronautics, Inc.; pp. 1- 9.
Pearson, J. et al.; Parametric Study of Solar Thermal Rocket Nozzle Performance; Huntsville, AL; 1994; pp. 1-7.

* cited by examiner

*Primary Examiner* — Tien Dinh
(74) *Attorney, Agent, or Firm* — Armstrong Teasdale LLP

(57) ABSTRACT

A vehicle is disclosed that includes a propellant tank, an optical absorber operable to transform optical energy into thermal energy, a quantity of solid lithium within the propellant tank, a heat exchanger, and an engine. The heat exchanger is operable to transfer thermal energy from the optical absorber to the quantity of solid lithium to liquefy at least a portion of the solid lithium, and further operable to boil the liquefied portion of the solid lithium. The engine is operable to utilize lithium vapor from the boiled lithium to propel the vehicle.

13 Claims, 2 Drawing Sheets

METHODS AND SYSTEMS FOR PROPELLING AN EXTERNALLY POWERED VEHICLE

BACKGROUND

The field of the disclosure relates generally to choices of propellant for a particular application, and more specifically, to propellant properties as well as to methods and systems for propelling an externally powered vehicle.

Proposals for and tests of solar thermal rocket (STR) and laser thermal rocket (LTR) propulsion have primarily used hydrogen as a propellant as it offers the advantage of high specific impulse. For use as a rocket propellant, hydrogen must be liquified, then maintained at a cryogenic temperature. Because cryogenic refrigeration systems are heavy and consume power, the usual approach to using hydrogen as a STR propellant is to consume the hydrogen before much of it boils away. Use is typically expected within a few days or weeks of launch.

STR missions that require on-orbit lifetimes longer than a few months before using the hydrogen are impractical because the hydrogen boils away. Useful missions that require long lifetimes (and are therefore poor candidates for hydrogen-propelled STR) include satellite maneuvering, orbit capture at the end of an interplanetary trajectory, trans-Earth orbit injection for planetary sample return, and satellite station-keeping or orbit maintenance. Another mission, satellite rescue, does not absolutely require a long orbit lifetime but could benefit from long lifetime by using a rescue vehicle for more than one rescue.

Metal parts exposed to hydrogen must be designed with extra strength, or exotic alloys, which add mass and cost. Hydrogen has very low density: 70 kg/m$^3$ as a liquid at atmospheric pressure. A given mass of hydrogen therefore has a large volume. Volume is costly for launch to space, requiring heavy tanks and adding atmospheric drag. Propellant tanks containing hydrogen must be heavy because of the need for good thermal insulation and the tanks must be oversized to accommodate boil off.

BRIEF DESCRIPTION

In one aspect, a vehicle is provided that includes a propellant tank, a quantity of solid lithium within the propellant tank, an optical absorber operable to transform optical energy into thermal energy, a heat exchanger, and an engine. The heat exchanger is operable to transfer thermal energy from the optical absorber to the quantity of solid lithium to liquefy at least a portion of the solid lithium, and further operable to boil the liquefied portion of the solid lithium. The engine is operable to utilize lithium vapor from the boiled lithium to propel the vehicle.

In another aspect, a method for propelling a vehicle is provided that includes generating a quantity of thermal energy from light energy, utilizing a portion of the thermal energy to melt solid lithium within a propellant tank thereby providing liquefied lithium, pumping the liquefied lithium through a heat exchanger to generate boiling lithium, and utilizing vapor generated from the boiling lithium as a propellant.

In still another aspect, a vehicle including a solid propellant containing lithium for propelling the vehicle is provided. The vehicle is operable to transform optical energy into thermal energy and utilize the thermal energy liquefy at least a portion of the solid propellant to propel the vehicle.

The features, functions, and advantages that have been discussed can be achieved independently in various embodiments or may be combined in yet other embodiments further details of which can be seen with reference to the following description and drawings.

DETAILED DESCRIPTION

Embodiments described herein facilitate the use of solid lithium as a storable propellant in a solar thermal rocket (STR) engine or as a high-density propellant in a laser thermal rocket engine. Embodiments include mechanisms for melting the lithium so it can flow into the engine.

In the embodiments, lithium is the dominant solid element within the solid mass that must be melted so the propellant can flow into a heat exchanger. The solid propellant may be a mostly-lithium matrix that contains, for example, particles of higher-melting-point solids with low molecular mass, or inclusions of some liquid that either has low molecular mass or easily decomposes in the heat exchanger to produce a gas with low molecular mass. Regardless of whether the lithium is nearly pure, or a lithium matrix with other chemicals embedded within it, the two primary advantages of lithium are attained: low molecular mass and a melting temperature that is slightly above room temperature.

Figure 1:
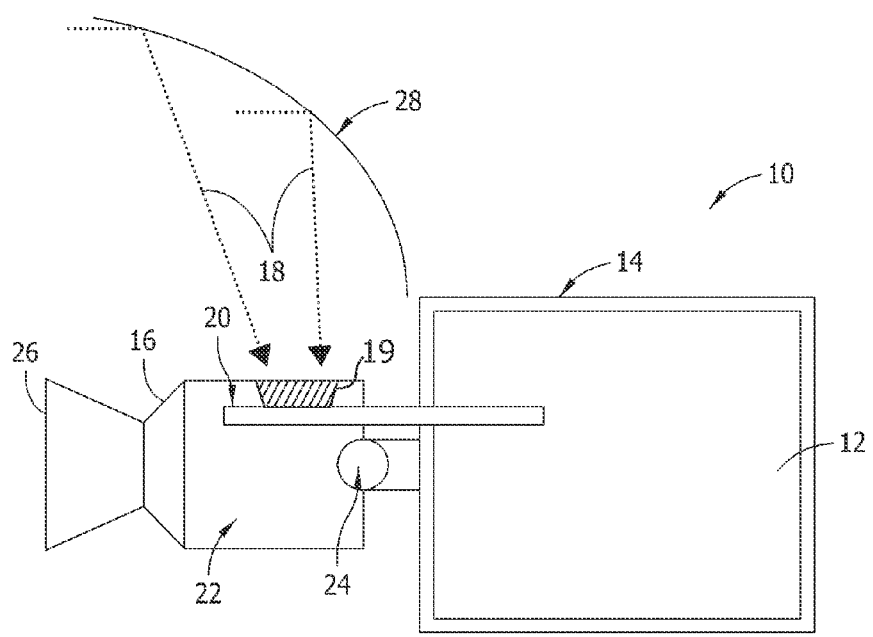
FIG. 1 is a schematic diagram of a solar (or laser) thermal rocket showing solid lithium propellant in a tank, and a heat conduit from the solar (or laser) heat collector used for melting the lithium.

An example embodiment of a solar (or laser) powered rocket 10 is shown in FIG. 1. In the illustrated embodiment, the lithium 12 is contained in a conventional propellant tank 14. Melting the lithium 12 before starting the engine 16 is accomplished, in one embodiment by collecting sunlight 18 at moderate concentration with an optical absorber 19 operable to transform optical energy into thermal energy. A heat conduit 20 is utilized, a heat pipe in one embodiment, to transfer the thermal energy from a heat collector 22 to the solid lithium 12. In alternative embodiments, other forms of energy may be utilized to heat the heat conduit 20 or otherwise transfer energy to the solid lithium 12. Once the propellant is liquified, the rocket 10 can utilize pump 24 to pump liquid lithium 12 into the heat collector/exchanger 22 via the heat conduit 20.

Within the heat exchanger 22, energy from sunlight 18 boils the liquid to generate a lithium vapor which is further heated by the heat exchanger 22. The hot lithium vapor exits through the nozzle 26, producing thrust. In one embodiment, a reflector 28 directs or concentrates the sunlight 18 (or laser) towards the heat collector 22.

Lithium has the lowest molecular mass of any element that is solid at room temperature. Lithium melts at 180° C. and boils at 1342° C. In the described embodiments, solid lithium is stored at ambient temperature throughout a long-duration mission. The lithium is melted just before it enters an STR engine. The STR engine further heats the lithium, which exits as a high velocity gas to produce thrust.

Use of lithium offers the following advantages over known propellants. Specifically, solid lithium has extremely low vapor pressure, so unlike hydrogen, no special effort is required to prevent lithium from boiling or sublimating before it can be consumed as propellant. Thus, it can be used as a storable propellant. Vehicles sent on long missions experience no danger that excessive boil off will compromise the mission objectives or safety. Vehicles can be stored inert for years or decades, then used immediately without need to load propellant. An on-orbit satellite rescue vehicle remains useful even with multi-year delays between rescues. In contrast, a hydrogen-propelled solar thermal rescue vehicle which typically has less than a year of useful life following launch unless active refrigeration is used.

Lithium's tolerance for long duration flight means that some unmanned missions use lower thrust to weight ratios than missions that utilize other propellants thereby permitting use of a smaller, lighter, less expensive engine. Though lithium can be made to burn, it is nowhere near as combustible as hydrogen and, unless finely powdered and dispersed in air, cannot be made to explode. Lithium therefore poses much less hazard during launch operations and imposes fewer operational costs. For example, if on-pad maintenance is needed, a ground crew could safely approach a vehicle containing a large block of solid lithium. A fully loaded lithium-propelled STR could be launched in a manned vehicle or carried in a manned airplane with little or no safety impact.

Solid lithium cannot leak out of punctures or cracks. Punctures or cracks in a lithium STR produces leaks only for the short interval between melting the lithium and consuming it as propellant. Therefore, larger punctures and cracks are tolerated so the amount of structure and shielding needed to prevent or minimize punctures and cracks is reduced, thereby also reducing weight and cost. Lithium does not cause embrittlement of other metals and has a much greater density (540 kg/m$^3$) than other propellants. Therefore enclosing a given mass of lithium requires much less volume than an equal mass of hydrogen. Even when the tank is enlarged to enclose the greater mass of lithium needed to provide a given $\Delta v$, the lithium tank is still substantially smaller than a hydrogen tank, reducing tank mass, shroud size, and aerodynamic drag during launch. In addition, the higher density of liquid lithium reduces the feed line diameter and the size, mass, and power of the pump needed to pump propellant into the engine. If pressurant gas is used instead of a pump, higher propellant density means less pressurant gas, smaller pressurant tanks, and lower pressurant flow rates are needed.

Solid lithium requires little or no insulation or refrigeration in almost any situation further reducing tank mass and cost compared to liquid hydrogen. Furthermore, since the lithium need not be cold, the use of lithium avoids the buildup of ice on the outside of spacecraft before launch, reducing the danger of ice impact damage to lower parts of the spacecraft.

In one example, in a mission to Venus, lithium would be solid on the Earth, but would easily become a liquid by the time the craft arrived at Venus due to the significantly warmer Venutian environment (Blackbody temperature at 54.5° C., at Venus's distance from the Sun). This allows for its safe storage without any loss during interplanetary transport, that is, the fuel is solid until it reaches the destination planet, then melted and consumed or expelled without leakage or loss.

Lithium vapor is monatomic and therefore does not exhibit frozen flow. Essentially no thermal energy is lost to rotational, vibrational or dis-associational degrees of freedom which means efficiency is higher and the solar concentrator 28 is smaller for a given power level, saving cost and mass.

Solid lithium does not slosh in tanks. This reduces the need for anti-slosh baffles in the tank. Some baffles are still needed when the lithium is melted and the solar thermal rocket is producing thrust, but these conditions will typically be much less demanding than the slosh environment during launch aboard a booster rocket.

The obvious drawback of using lithium instead of hydrogen is reduced specific impulse, $I_{sp}$. This performance loss arises from the difference in molecular weights between lithium (6.941) and hydrogen (2.016). Assuming the STR engine can heat both propellants to the same temperature, that no dissociation occurs in the hydrogen, and that frozen flow is negligible, the $I_{sp}$ ratio is given by equation 6:

$$\frac{I_{sp}(\text{Li})}{I_{sp}(\text{H}_2)} = \sqrt{\frac{2.016}{6.941}} = 0.539 \tag{1}$$

Thus, a high-performance STR engine that can produce an $I_{sp}$ of 1000 seconds with hydrogen would produce a 539 second $I_{sp}$ with lithium, to a first approximation. Such $I_{sp}$ is substantially better than the best chemical engine performance (by roughly 450 seconds), but is obviously much lower than the hydrogen STR performance. Despite reduced $I_{sp}$ compared to hydrogen, the benefits of lithium propellant can result in comparable overall system mass for some missions.

A sizing analysis comparing lithium to hydrogen for a long duration, high-$\Delta$-v mission has been performed. The example mission required accelerating a 6.6 metric ton payload through a 5625 meters per second $\Delta v$ about two years after launch from Earth. The analysis included tank sizing, insulation, refrigeration, boil off, and engine sizing to meet a thrust-to-weight constraint. The analysis did not include the benefits of feed line size, turbo pump size, turbo pump power, reduced slosh at launch, or unfrozen flow. Despite this, the basic vehicle mass using lithium was only 28% greater than with hydrogen.

With the preferred propellant embodiments described below, the best lithium STR option gives 3% lower mass than the H$_2$ system. There are at least two paths to higher $I_{sp}$ using preferred embodiments of the lithium propellant. One embodiment uses lithium that is partially enriched in the lighter lithium isotope, Li6. Natural lithium is a mixture of two isotopes, Li7 (92.5%) and Li6 (7.5%). The US Department of Energy and its counterparts in Russia and France have developed a substantial infrastructure for enriching lithium to almost pure Li6 for use in fusion weapons. The cost of isotopic enrichment to about 50% Li6 should not be prohibitive compared to the cost of transporting material into space. At 50% enrichment, the average atomic mass of lithium is 6.52, yielding an improvement in $I_{sp}$ given by:

$$\frac{I_{sp}(\text{enriched Li})}{I_{sp}(\text{natural Li})} = \sqrt{\frac{6.941}{6.516}} = 1.032 \tag{2}$$

Thus an STR that yields 1000 seconds $I_{sp}$ with hydrogen and 539 sec $I_{sp}$ with natural lithium would yield an $I_{sp}$ of 556 sec with 50% enriched Li6.

In another embodiment, lithium hydride particles, LiH, are mixed into the matrix of solid lithium. The lithium would melt in the tank and carry the LiH particles along into the engine, just as liquid hydrogen should carry slush particles along in a slush hydrogen system. Lithium hydride decomposes at high temperature. As it decomposes to form lithium vapor and H2 gas, and assuming equal numbers of lithium and lithium hydride molecules are in the propellant, the average molecular weight in the exhaust would be 5.956, giving an $I_{sp}$ of 593 sec with the nominal STR. Performance would be better if the hydrogen does not recombine to form H2, but experiments are needed to determine the extent of recombination.

For maximum performance, another embodiment of propellant combines the isotopic and chemical enhancements. In the embodiment, 50% isotopically enriched lithium is used to create LiH particles in a lithium matrix. Assuming 100% recombination of hydrogen atoms to form $H_2$, this would give an average molecular weight of 5.556 in the exhaust and a nominal $I_{sp}$ of 614 sec.

Figure 2:
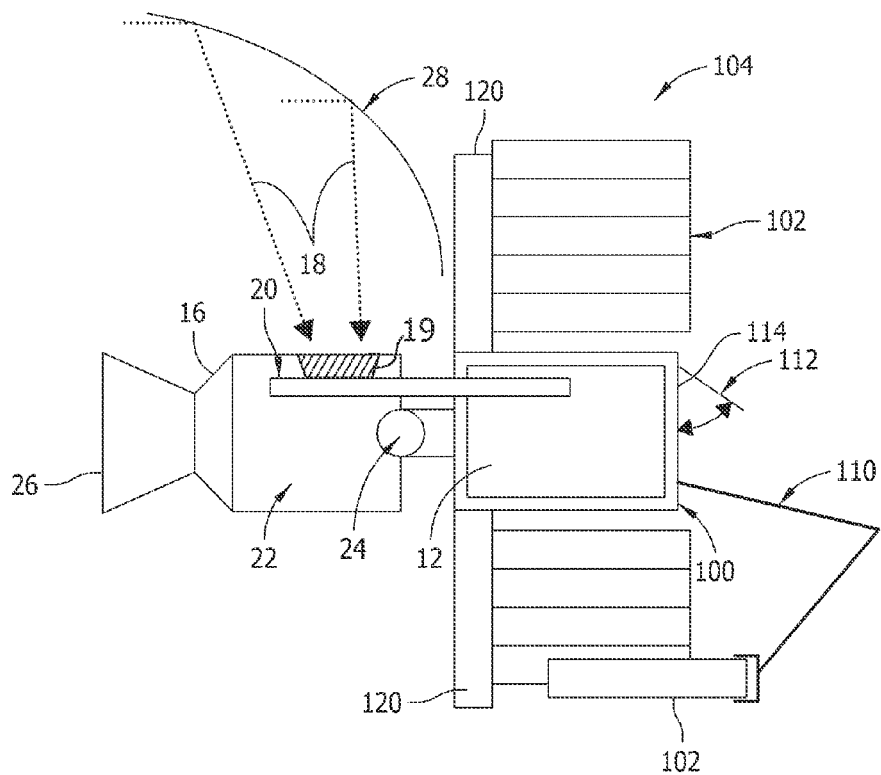
FIG. 2 is a schematic diagram of a solar thermal rocket showing solid lithium propellant stored external to a tank, with a mechanism for inserting the lithium into the tank for use as a propellant.

An alternative embodiment is illustrated in FIG. 2. Components in FIG. 2 that are the same as components in FIG. 1 are illustrated using the same reference numbers. Propellant tank 100 is reduced in size and mass from tank 12 (shown in FIG. 1). The lithium is stored externally as solid bars 102 and melted within the smaller propellant tank 100. The solid bars 102 of lithium are stored outside the vehicle 104, in embodiments protected by a thin wrapper or coating. A robotic feed mechanism 110 acquires a lithium bar 102, and a lid 112 on a port 114 in the tank 100, inserts the lithium bar 102 into the tank 100, and closes the port 114 with the lid 112. In embodiments, each bar 102 contains a small pocket of low-boiling material, e.g. methanol, that acts as a pressurant by boiling when the lithium melts.

For a low thrust-to-weight mission, the structure needed to keep the lithium bars 102 attached to the vehicle 104 has very little mass. In FIG. 2, a few lithium bars 120 support the remainder of the lithium bars 102 and these support bars 120 are used as propellant after the other bars 102 are expended. Using this approach, exceptionally high mass ratios are achieved, thereby permitting a high Δv.

As explained herein, other propellants require large volumes and large systems to hold the large volumes such that no leakage occurs, which is particularly difficult on long-duration missions. In contrast, lithium can be stored in a much smaller, less expensive system. Lithium also has a better specific impulse than a fuel like hydrazine, which has been proposed as an alternative to hydrogen.

Solid lithium does not leak out of small cracks in the infrastructure, carries little risk of fires, does not embrittle parts on the fuel storage system it sits inside, or on the nozzles as the exhaust exits, and requires far less volume than other propellants, and it need not be frozen or chilled by large, heavy cooling systems to function. As illustrated in FIG. 2, lithium can provide support for itself, remaining fuel stores and other structures in a vehicle.

Figure 3:
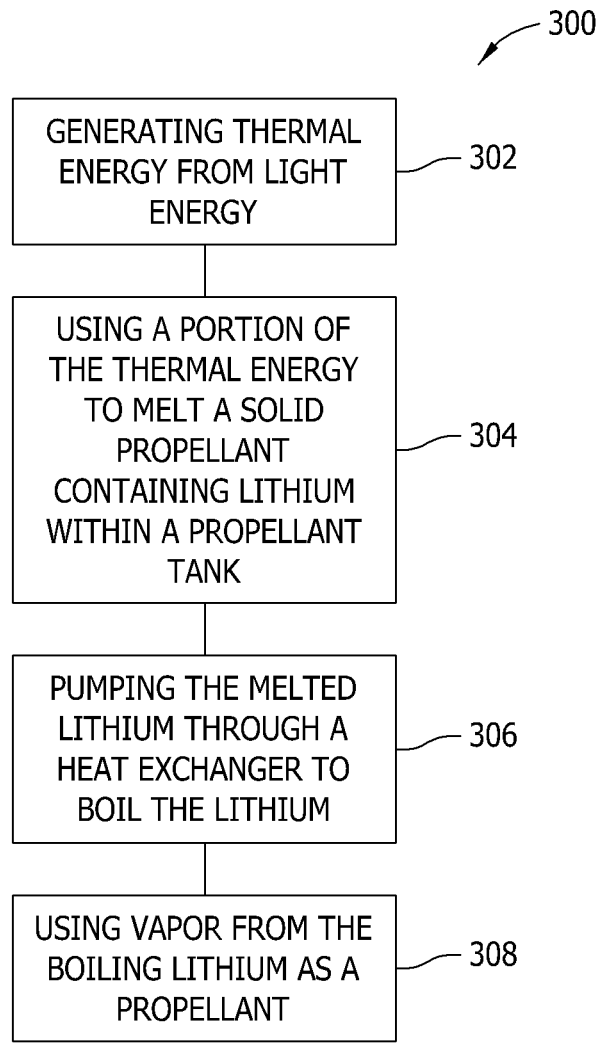
FIG. 3 is a flowchart that illustrates a method for propelling a vehicle.

FIG. 3 is a flowchart 300 that illustrates a method for propelling a vehicle based on the embodiments described herein. The method includes generating 302 a quantity of thermal energy from light energy, utilizing 304 a portion of the thermal energy to melt solid lithium within a propellant tank thereby providing liquefied lithium, pumping 306 the liquefied lithium through a heat exchanger to generate boiling lithium, and utilizing 308 vapor generated from the boiling lithium as a propellant.

In certain applications, the STR engine may be utilized as soon as a small portion of the lithium has been melted, rather than an entire tank of lithium. In these embodiments, channels are provided through the block of lithium so pressurant gas from the top of the tank can get to the lithium being melted at the bottom of the tank, thereby pushing the melted lithium toward the heat exchanger.

In an alternative embodiment, blocks of lithium are segmented into smaller portions, with a relatively poor heat conductor between the portions. The segmenting reduces the energy needed to melt a subset of the lithium. Instead of conducting heat through an entire block of lithium and raising it all to nearly melting, the heat stays near the heat conduit and more quickly melts the local lithium. In various embodiments, insulating gaps are filled with air or another gas, or with a material that can be ingested by the heat exchanger and thermally decomposed to produce a gas that helps produce thrust.

The described embodiments address certain of the problems to be overcome when considering exploration of the surfaces of near-Earth asteroids and of other planets. A second general problem that may be addressed by the embodiments herein is the enablement greater in-orbit maneuvering by satellites, both to achieve unwarned flyover and to avoid increasing threats. Both problems benefit from and are addressed through improved performance of storable-in-space propulsion as described herein.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle comprising:
   a propellant tank;
   a quantity of solid propellant containing lithium within said propellant tank;
   an optical absorber operable to transform optical energy into thermal energy;
   a heat exchanger;
   a heat conduit coupled to said optical absorber and to said heat exchanger, said heat conduit operable to transfer thermal energy from said optical absorber to said quantity of solid propellant to liquefy at least a portion of the solid propellant, said heat conduit oriented to channel the liquefied portion of the lithium in the propellant to said heat exchanger, said heat exchanger operable to boil the liquefied portion of the lithium in the propellant; and
   an engine operable to utilize lithium vapor from the boiled lithium to propel said vehicle.

2. The vehicle according to claim 1 further comprising a concentrating reflector operable to direct light towards said optical absorber.

3. The vehicle according to claim 1 further comprising a pump operable to pump the liquefied portion of the solid propellant into said heat exchanger.

4. The vehicle according to claim 1 further comprising:
   a second quantity of solid propellant containing lithium positioned external to said vehicle;
   a port on said propellant tank; and
   a mechanism operable to open and close said port and place a portion of the second quantity of solid propellant into said propellant tank via said port.

5. The vehicle according to claim 4 wherein said second quantity of solid propellant comprises bars containing lithium protected by at least one of a wrapper and a coating.

6. The vehicle according to claim 5 wherein said a portion of said bars containing lithium support a remainder of said bars containing lithium.

7. The vehicle according to claim 1 wherein said quantity of solid propellant containing lithium comprises a pocket of low-boiling material therein operable as a pressurant by boiling when the lithium melts.

8. The vehicle according to claim 1 wherein said propellant tank is configured to store said quantity of solid propellant containing lithium at an ambient temperature.

9. The vehicle according to claim 1 wherein said quantity of solid propellant containing lithium comprises lithium enriched with a lighter lithium isotope, Li6.

10. The vehicle according to claim 1 wherein said quantity of solid propellant containing lithium comprises lithium mixed with lithium hydride particles.

11. The vehicle according to claim 1 wherein said quantity of solid propellant containing lithium comprises lithium enriched with a lighter lithium isotope, Li6, the enriched lithium mixed with lithium hydride particles.

12. The vehicle according to claim 1 wherein said vehicle comprises a space vehicle.

13. A vehicle comprising:
a propellant tank comprising a port and a mechanism operable to open and close said port, wherein a first quantity of solid propellant containing lithium is within said propellant tank, and a second quantity of solid propellant containing lithium is external to said vehicle, said mechanism operable to place a portion of the second quantity of solid propellant into said propellant tank via said port;
an optical absorber operable to transform optical energy into thermal energy;
a heat exchanger operable to transfer thermal energy from said optical absorber to said quantity of solid propellant to liquefy at least a portion of the solid propellant, said heat exchanger operable to boil the liquefied portion of the lithium in the propellant; and
an engine operable to utilize lithium vapor from the boiled lithium to propel said vehicle.

* * * * *